Patented Dec. 4, 1951

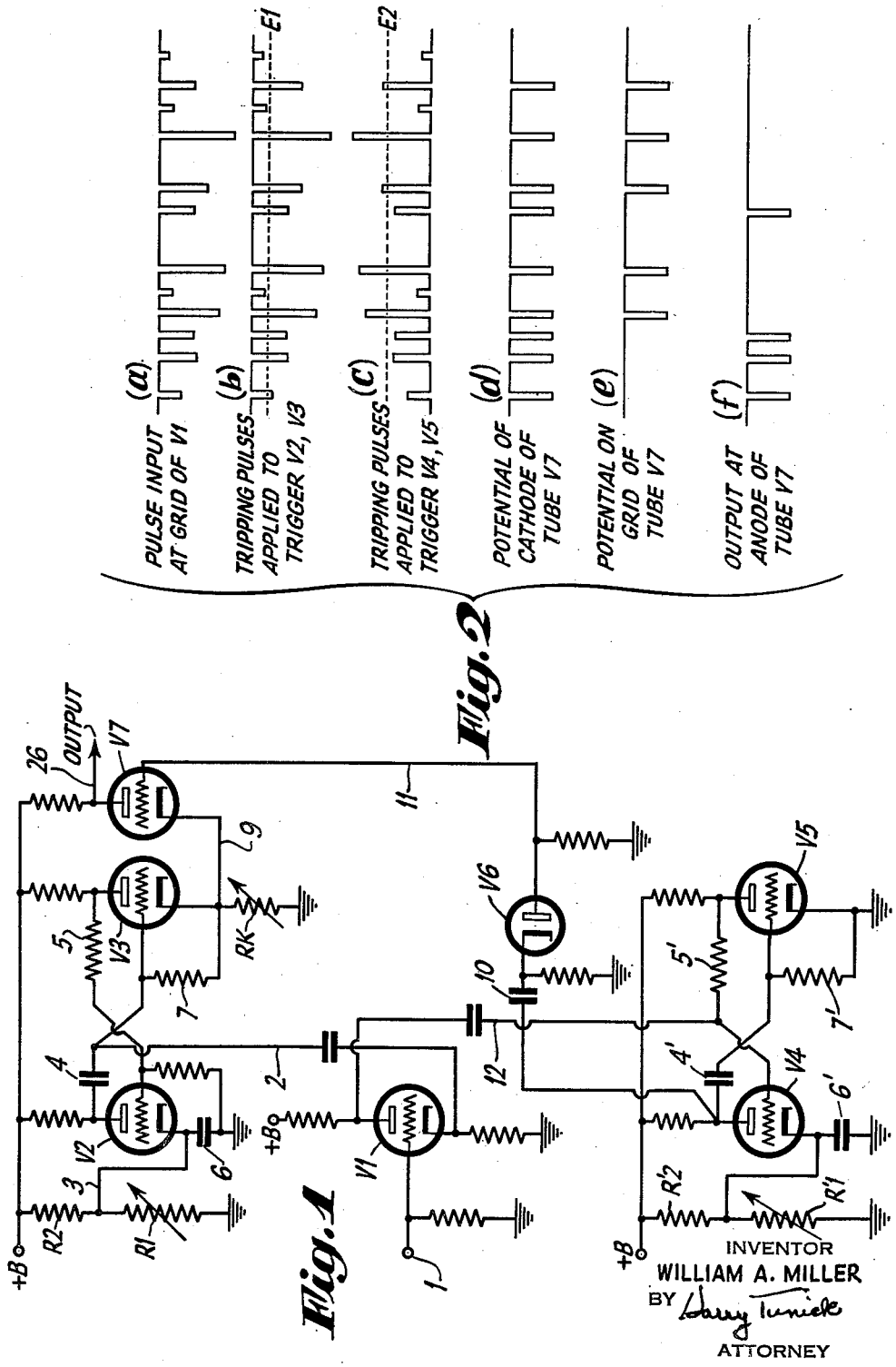

2,577,475

UNITED STATES PATENT OFFICE 2,577,475

TRIGGER OPERATED PULSE AMPLITUDE SELECTOR

William A. Miller, Port Jefferson, N. Y., assignor to Radio Corporation of America, a corporation of Delaware Application April 27, 1948, Serial No. 23,417

7 Claims. (Cl. 250—27)

This invention relates to a method of and apparatus for distinguishing between pulses of different amplitudes.

An object of the invention is to enable the selection of pulses whose amplitudes lie within limits which may be made to be arbitrarily close.

Another object is to enable the elimination of interfering pulses which are of higher or lower amplitudes than the desired pulses.

It is known to use pulse amplitude selector circuits employing vacuum tubes to pass the applied pulses. Such known circuits however generally lack a linearity of response over the entire required amplitude range, and hence do not achieve the desired cancellation effect of undesired pulses of large amplitudes in the output of the system. In such systems, those applied pulses which are of sufficient magnitude to cause grid current limiting are not completely cancelled.

The present invention overcomes the foregoing difficulty and provides an output pulse which has an amplitude independent of the amplitude of the input wave. This feature is particularly important when the system of the invention is used as a control device.

The system of the invention may be used in a pulse communication receiver wherein it is desired to discriminate between desired incoming pulses and interfering pulses. Other applications of the invention, given by way of illustration, are: in circuits for investigating nuclear physics problems; in automatic weighing apparatus; in servomechanisms; and in "go-no go" gauging mechanisms.

In accordance with the invention, there is provided a circuit arrangement comprising two self-restoring trigger circuits controlled from different electrodes of a coupling tube to which the input pulses (whose amplitudes are to be selected) are applied. The two trigger circuits are arranged to trip at different levels of the input pulse, and with pulses of different polarities supplied from the coupling tube. Each trigger circuit includes two electron discharge device electrode structures arranged regeneratively. The tripping level in each trigger circuit is made adjustable. The amplitude of the output pulse from each trigger circuit is independent of the amplitude of the input pulse provided only that the input pulse is above the tripping level. A vacuum tube is provided in common to the outputs of both trigger circuits and is so coupled to the two trigger circuits that it furnishes an output pulse only if the magnitude of the input pulse lies between two selected values.

A more detailed description of the invention follows in conjunction with a drawing, wherein:

Fig. 1 shows a trigger operated pulse amplitude selector in accordance with the invention; and Fig. 2 is a series of curves given in explanation of the operation of the system of Fig. 1.

Referring to Fig. 1, there is shown an input terminal 1 to which both the desired pulses and undesired pulses are supplied, and an output terminal 26 from which voltage pulses whose amplitudes lie within selected limits are obtained. Between terminals 1 and 26 there are provided a balanced cathode follower triode vacuum tube V1, a pair of self-restoring trigger circuits V2, V3 and V4, V5, and a vacuum tube V7 in common to the outputs of both trigger circuits and controlled thereby. Each trigger circuit includes two vacuum tube triode electrode structures located within separate evacuated envelopes, or if desired, within a single envelope. The anodes and grids of the electrode structures are interconnected regeneratively, so that if one electrode structure is passing maximum current the other electrode structure of the same trigger circuit will be passing minimum current, viz: be cut-off, and vice versa. The tubes in each trigger circuit are so biased that one tube is normally conducting while the other tube is normally cut-off. This condition or status is called the stable state. A suitable tripping pulse of predetermined polarity and magnitude will fire or trip the trigger circuit into the active state in which the current passing conditions of the two tubes are reversed. After a period of time determined by the time constants of the trigger circuit, it will return or restore itself to the stable state. It will thus be seen that the trigger circuits each have only one degree of electrical stability.

In trigger circuit V2, V3, the tube V2 is normally cut-off, while the tube V3 is normally conducting, in the stable state. A voltage divider comprising resistors R2 and R1 in series is connected between ground and the positive terminal B+ of the unidirectional source of anode potential for this trigger circuit. A lead 3 connects the junction of resistors R2, R1 to the cathode of tube V2 and supplies a positive potential to this cathode of sufficient magnitude to bias tube V2 to cut-off. This is equivalent to supplying a negative potential to the grid of tube V2. Resistor R1 is variable and serves to adjust the tripping level of trigger circuit V2, V3. A condenser 4 couples the anode of tube V2 to the grid of tube V3, while a resistor 5 couples the anode of tube V3 to the grid of tube V2. A condenser 6 serves to bypass resistor R1 for the duration of the trigger pulse. A variable resistor RK connects the cathode of tube V3 to ground. This resistor is common to the cathode of tube V3 and the cathode of common output tube V7, by virtue of lead 9 connecting together both of these cathodes.

Once the trigger circuit V2, V3 is tripped, it will remain in the active state for a duration determined mainly by the time constants of condenser 4 and its discharge path composed of resistors 7 and RK.

Trigger circuit V4, V5 operates in a manner similar to trigger circuit V2, V3, except for the fact that it is arranged to trip at a different level of input pulse and with a different polarity of applied pulse. Corresponding elements in both trigger circuits have been given the same reference characters, except that those in trigger circuit V4, V5 have a prime designation. In trigger circuit V4, V5 the tube V4 is normally cut-off while the tube V5 is normally conducting in the stable state of the trigger circuit. The active time of trigger circuit V4, V5 is made to be not less than the active time of trigger circuit V2, V3, and the active time of each trigger circuit is less than the duration between adjacent input pulses to be selected.

The anode of tube V4 is connected through a blocking condenser 10 to the cathode of a vacuum tube rectifier V6 whose anode is connected via lead 11 to the grid of common output tube V7. The vacuum tube V6 is illustrative of any suitable rectifier which can be used, and need not be an electron discharge device. An inspection of the circuit arrangement will show that rectifier V6 will conduct only when a negative pulse is supplied to its cathode through condenser 10.

The pulses whose amplitudes are to be selected are supplied from input terminal 1 to the grid of the balanced cathode-follower tube V1 from whose anode and cathode, in turn, are obtained D. C. pulses simultaneously available in leads 2 and 12 respectively, which are equal but opposite in polarity, and of an amplitude proportional to the amplitude of the input pulse or signal applied to terminal 1.

In the operation of the system of the invention, let be assumed that the input pulses applied to terminal and to the grid of the balanced cathode-follower tube V1 are of negative polarity and of a spacing and magnitude like those illustrated in curve A of Fig. 2. The resulting waveforms appearing on leads 2 and 12 connected to the cathode and anode electrodes of the balanced tube V1 are illustrated in curves $b$ and $c$, respectively, of Fig. 2. It should be noted that curves $b$ and $c$ are the inverse of each other. The pulses in curve $b$ are of negative polarity and are applied to the grid of tube V3 of trigger circuit V2, V3, while the pulses in curve $c$ are of positive polarity and are applied to the grid of tube V4 of trigger circuit V4, V5. The tripping level of the pulses of curve $b$ necessary to trigger off or fire trigger circuit V2, V3 is represented by the horizontal dash line E1, while the tripping level of the pulses of curve $c$ necessary to trigger off or fire trigger circuit V4, V5 is represented by the horizontal dash line E2. It should be noted that these levels are different and that the horizontal line E1 has a lower potential than that of horizontal line E2. The adjustment of these tripping levels is accomplished by means of adjustable resistors R1 and R1'.

Trigger circuit V2, V3 will fire only when the negative pulses of curve-$b$ reach line E1, while trigger circuit V4, V5 will fire only when the positive pulses of curve-$c$ reach line E2.

Inasmuch as tube V3 of trigger circuit V2, V3 is normally conducting in the stable state, current will pass through resistor RK (common to the cathodes of tubes V3 and V7) of a value sufficient to bias tube V7 to cut-off while tube V3 conducts. Resistor RK is adjusted to effect this result. The tripping of trigger circuit V2, V3, caused by any pulse in curve $b$ which reaches level E1, will cause tube V3 to cease conducting for the duration of the active state of the trigger circuit. When tube V3 ceases conducting, the bias on tube V7 is removed from its cathode, and tube V7 conducts. The potential on the cathode of tube V7 is represented by the waveforms of curve $d$ of Fig. 2.

If, however, the trigger circuit V4, V5 is caused to fire by virtue of a tripping pulse on lead 12 which reaches or exceeds level E2 of curve $c$, then a negative pulse is passed by condenser 10 and rectifier V6 to the grid of tube V7 of sufficient magnitude to prevent tube V7 from conducting, even though the bias on the cathode of tube V7 has been removed by the firing of trigger circuit V2, V3. The pulses of curve $e$ of Fig. 2 illustrate the potential on the grid of tube V7 whenever trigger circuit V4, V5 fires.

The resulting output on output lead 26 connected to the anode of tube V7 is shown by the waveform of curve $f$ of Fig. 2. It will thus be observed that if the magnitude of the input pulse (curve $a$) applied to input terminal 1 is less than E1, neither trigger circuit will be tripped or fired. If, however, the magnitude of the input pulse applied to terminal 1 is greater than E1 but less than E2, then only trigger circuit V2, V3 will be tripped, while if the magnitude of the input pulse is greater than E2 (consequently also greater than E1) both trigger circuits V2, V3 and V4, V5 will be tripped. The pulse output at the anode of tube V7 (curve $f$) is thus available only if the magnitude of the input pulse applied to terminal 1 lies between the magnitudes of E1 and E2.

The output of tube V7 may be used to operate any suitable control device, counter, or integrating circuit.

What is claimed is:

1. A pulse amplitude selector system comprising first and second self-restoring trigger circuits arranged to trip at different levels of pulses applied thereto, a balanced cathode-follower tube having a grid, a cathode and an anode, a connection from said anode to a tripping electrode of said first trigger circuit, a connection from said cathode to a tripping electrode of said second trigger circuit, means for supplying said grid with pulses to be selected and whose amplitudes lie within limits corresponding to said different levels, an electron discharge device coupled to said first trigger circuit and biased to be ineffective during the stable state of said first trigger circuit, said device being arranged to produce a useful output when said first trigger circuit is tripped, and means coupling said electron discharge device to said second trigger circuit for rendering said device ineffective upon the tripping of said second trigger circuit.

2. A pulse amplitude selector system comprising first and second self-restoring trigger circuits arranged to trip at different levels of pulses applied thereto, a balanced cathode-follower tube having a grid, a cathode and an anode, a connection from said anode to a tripping electrode of said first trigger circuit, a connection from said cathode to a tripping electrode of said second trigger circuit, means for supplying said grid with pulses to be selected and whose amplitudes lie within limits corresponding to said different levels, an electron discharge device having a cathode coupled to said first trigger circuit and biased to be non-conducting during the stable state of said first trigger circuit and to become conducting during the tripped state of said first trigger circuit, said device having a grid coupled to said second trigger circuit through a circuit arranged to provide a negative pulse to said grid whenever said second trigger circuit trips, said negative pulse being of such magnitude as to prevent said electron discharge device from passing current despite the operation of said first trigger circuit.

3. A pulse amplitude selector system in accordance with claim 1 in which each of said trigger circuits includes a time constant circuit, said time constant circuits being so chosen that the trigger circuit which operates at the upper level has an active time not less than the active time of the other trigger circuit.

4. A pulse amplitude selector system comprising first and second self-restoring trigger circuits arranged to trip at different levels of pulses applied thereto, each trigger circuit comprising a pair of electrode structures arranged regeneratively, a balanced cathode-follower tube having a grid, a cathode and an anode, a connection from said anode to a tripping electrode of said first trigger circuit for supplying thereto a pulse of predetermined polarity, a connection from said cathode to a tripping electrode of said second trigger circuit for supplying thereto a pulse of opposite polarity, means for supplying said grid with pulses to be selected, an electron discharge device having a grid, a cathode and an anode, a direct connection from the cathode of said device to the cathode of one electrode structure of said first trigger circuit, a common cathode resistor for said last cathodes, a connection including a rectifier from the grid of said device to the anode of one electrode structure of said second trigger circuit, and means for deriving output pulses coupled to the anode of said device.

5. A pulse amplitude selector system comprising first and second self-restoring trigger circuits arranged to trip at different levels of pulses applied thereto, each trigger circuit comprising a pair of electrode structures arranged regeneratively, one of said electrode structures of said pair normally passing current while the other electrode structure of said pair is normally cut-off for the stable state of the trigger circuit, and vice versa for the active state of the trigger circuit, the active time of the second trigger circuit which operates at the upper level being no less than that of the first trigger circuit which operates at the lower level, a balanced cathode-follower tube having a grid, a cathode and an anode, a connection from said cathode to a tripping electrode of said first trigger circuit for supplying thereto a pulse of predetermined polarity, a connection from said anode to a tripping electrode of said second trigger circuit for supplying thereto a pulse of opposite polarity, means for supplying said grid with pulses to be selected, an electron discharge device having a grid, a cathode, and an anode, a direct connection from the cathode of said discharge device to the cathode of the normally conducting electrode structure of said first trigger circuit, a common cathode resistor for the cathode of said discharge device and for the cathode of the normally conducting electrode structure of said first trigger circuit, a series connection of condenser and rectifier coupling the grid of said discharge device to the anode of the normally cut-off electrode structure of said second trigger circuit, whereby the tripping of said second trigger circuit causes a negative pulse to be applied to the grid of said discharge device of sufficient magnitude as to prevent said discharge device from passing current for the duration of said negative pulse, and means for deriving output pulses from said discharge device whenever it passes current.

6. A pulse amplitude selector system comprising first and second trigger circuits arranged to trip at different levels of pulses applied thereto, a cathode-follower tube having a grid, a cathode and an anode, a connection from said anode to a tripping electrode of said first trigger circuit, a connection from said cathode to a tripping electrode of said second trigger circuit, means for supplying said grid with pulses to be selected and whose amplitudes lie within limits corresponding to said different levels, an electron discharge device coupled to said first trigger circuit and biased to be ineffective during the stable state of said first trigger circuit, said device being arranged to produce a useful output when said first trigger circuit is tripped, and means coupling said electron discharge device to said second trigger circuit for rendering said device ineffective upon the tripping of said second trigger circuit.

7. An amplitude selector system comprising first and second trigger circuits arranged to trip at different levels of waves applied thereto, a phase inverter circuit having an input electrode and a pair of output electrodes, a connection from one of said output electrodes to a tripping electrode of said first trigger circuit, a connection from the other output electrode of said pair to a tripping electrode of said second trigger circuit, means for supplying said input electrode with waves to be selected and whose amplitudes lie within limits corresponding to said different levels, an electron discharge device coupled to said first trigger circuit and biased to be ineffective during one condition of said first trigger circuit, said device being arranged to produce a useful output pulse during the other condition of said first trigger circuit, and means coupling said electron discharge device to said second trigger circuit for rendering said device ineffective upon the tripping of said second trigger circuit.

WILLIAM A. MILLER.

REFERENCES CITED

The following references are of record in the file of this patent:

UNITED STATES PATENTS

| Number | Name | Date |
| --- | --- | --- |
| 2,338,395 | Bartelink | Jan. 4, 1944 |
| 2,403,918 | Grosdoff | July 16, 1946 |
| 2,406,882 | Young, Jr. | Sept. 3, 1946 |
| 2,408,079 | Labin et al. | Sept. 24, 1946 |
| 2,419,548 | Grieg | Apr. 29, 1947 |
| 2,496,909 | Eberhard | Feb. 7, 1950 |